United States Patent [19]

Federspiel

[11] Patent Number: 5,464,369
[45] Date of Patent: Nov. 7, 1995

[54] METHOD AND APPARATUS FOR ESTIMATING THE RATE AT WHICH A GAS IS GENERATED WITHIN AN ENCLOSED SPACE

[75] Inventor: Clifford C. Federspiel, Shorewood, Wis.

[73] Assignee: Johnson Service Company, Milwaukee, Wis.

[21] Appl. No.: 202,281

[22] Filed: Feb. 25, 1994

[51] Int. Cl.$^6$ ................................................ F24F 11/00
[52] U.S. Cl. ................. 454/256; 454/229; 236/49.3; 236/94
[58] Field of Search ........................ 454/256, 233, 454/74, 229, 342, 257, 258; 62/78, 186, 177, 178; 236/49.1, 49.3, 49.2, 94; 165/16; 340/541, 544, 573, 632, 633, 634

[56] References Cited

U.S. PATENT DOCUMENTS

| | | | |
|---|---|---|---|
| 4,257,319 | 3/1981 | Kucharczyk | 454/256 |
| 4,742,761 | 5/1988 | Horstman | 454/74 |
| 5,170,935 | 12/1992 | Federspiel. | |
| 5,215,498 | 6/1993 | Wong et al. | 454/256 |
| 5,261,596 | 11/1993 | Tachibana et al. | 454/229 X |
| 5,279,609 | 1/1994 | Meckler | 454/229 X |
| 5,292,280 | 3/1994 | Janu et al. | 454/229 |

OTHER PUBLICATIONS

An Experimental Determination of Ventilation Rate in Occupied Rooms Using Atmospheric Carbon Dioxide Concentration, J. M. Penman, Building and Environment, vol. 15, pp. 45–47 (1980).

*Primary Examiner*—Harry B. Tanner
*Attorney, Agent, or Firm*—Foley & Lardner

[57] ABSTRACT

A method and apparatus for controlling the environment within an enclosed space is provided. The apparatus monitors environmental variables, and responsive to the values of the environmental variables, estimates the rate at which a gas is being generated within the enclosed space. The apparatus generates control signals to control devices based on the rate at which the gas is being generated within the enclosed space. In the preferred embodiment, the apparatus estimates the rate at which carbon dioxide is being generated in the enclosed space. Based on the estimated carbon dioxide generation rate, the apparatus may be configured to control an HVAC system, a comfort control system, lights, alarms or other devices.

38 Claims, 4 Drawing Sheets

METHOD AND APPARATUS FOR ESTIMATING THE RATE AT WHICH A GAS IS GENERATED WITHIN AN ENCLOSED SPACE

FIELD OF INVENTION

The present invention relates generally to the field of building control-systems, such as HVAC (heating, ventilating, and air-conditioning) systems and security systems. More particularly, the present invention relates to a method and apparatus for providing control to a building system wherein the system changes its control behavior in response to input concerning the rate at which a gas, such as carbon dioxide, is being generated within an enclosed space.

BACKGROUND OF THE INVENTION

HVAC system controllers typically control devices which effect the environment in an enclosed space based on measurements of one or more environmental variables. For example, most HVAC systems include thermostats which sense the air temperature within a room and controllers which control the behavior of a heater or air conditioner to achieve a desired air temperature within the room based on the air temperature measurements.

However, factors other than air temperature significantly affect an occupant's comfort and security. For example, the ventilation rate (outdoor air flow rate) of an enclosed space is an important factor in indoor air quality. In particular, ASHRAE Standard 62-1989 states that the minimum outdoor flow rate should be 15 cfm/person.

To meet this standard, buildings have been designed so that, under typical circumstances, the actual flow rate within an enclosure will meet or exceed the recommended minimum outdoor flow rate. However, without a feedback controller to guarantee a 15 cfm/person ventilation rate, the actual outdoor flow rate for any given enclosure and situation may fall below the minimum recommended outdoor flow rate. In order to implement such a controller, the number of people in a room must be accurately measured. Based on the technology available in the prior art, it has proven difficult to accurately, inexpensively and unobtrusively make such measurements. Therefore, it is clearly desirable to provide a method for unobtrusively measuring the number of people occupying a room, and an apparatus for ventilating a room based on the actual number of occupants therein.

Moreover, when the number of occupants of a room changes abruptly, the extra heat and moisture created by the occupants should be compensated for by the HVAC system. One common way to compensate for load disturbances caused by time variable occupancy is to incorporate derivative action into the controller, so that changes in the number of occupants is quickly counteracted by adjustments made in the heat supplied. The drawback of this approach is that the controller will also be sensitive to noise in the measurement of the control variable. Additionally, disturbance rejection with feedback adversely effects the stability of a system. Therefore, it is desirable to provide a method for responding to time variable occupancy in such a way as to avoid instability and noise sensitivity.

Another approach to compensate for load disturbances caused by time variable occupancy is to use the average heat generated when the room is occupied as a feed forward term. However, the actual heat generated may vary greatly from the average heat generated because the number of occupants may differ significantly from the average. Also, such a system cannot determine when a room is occupied. Accordingly, it is desirable to provide a method for compensating for time variable occupancy using a feed forward term based on the actual number of occupants.

Factors which affect an occupant's comfort include air temperature, humidity, air velocity, clothing insulation, bodily heat production rate and mean radiant temperature. A system for providing adaptive control of HVAC systems based on these six parameters is disclosed in U.S. Pat. No. 5,170,935, issued Dec. 15, 1992 to Federspiel et al., the content of which is incorporated herein by reference. Unfortunately, it is not practically possible to directly measure some of these variables.

Consequently, prior art comfort control systems have been forced to make assumptions about the variables which are otherwise too difficult to measure. For example, one prior art comfort control system simply assumes that bodily heat production is known. Another prior art system assumes that bodily heat production is unknown but constant. These limiting assumptions reduce the accuracy of thermal comfort control methods. A more accurate estimate of bodily heat production could be made by measuring the pulse rate of all of the occupants of an enclosure via pulse rate sensors strapped to their wrists. Though this pulse-monitoring method may theoretically provide a superior thermal comfort control, it is clearly impractical for most real-world situations. Thus, it is desirable to provide a practical, relatively accurate apparatus and method for determining the amount of bodily heat generated by the occupants of an enclosed space.

Some building control systems are limited to addressing the physical comfort of occupants. However, it would also be desirable to provide a building control system that addressed the emotional comfort concerns of occupants as well. One factor affecting an occupant's emotional comfort is the amount of security a room or building provides. Specifically, people feel more secure when safeguards have been taken to inhibit and/or announce the presence of intruders. One's anxiety may be lessened, for example, if he or she does not have to search for a light switch upon first entering an unlit room. Likewise, one typically feels more secure when protected by an alarm system configured to detect and announce the presence of other occupants.

Consequently, security systems have been developed which detect the presence of humans. Prior art security systems detect humans based on sound, infrared radiation, or vision. Unfortunately, each of these systems has a flaw which may be exploited by intruders. For example, security systems based on sound can fail if the intruder is quiet. Infrared security systems can fail if the intruder is shielded. Vision systems can fail if the intruder is out of view or cannot be identified by the system. In addition, vision systems are also relatively expensive. Hence, it is clearly desirable to provide a method and apparatus for detecting the presence of an occupant which does not suffer the disadvantages of the present security systems.

SUMMARY OF THE INVENTION

According to one aspect of the present invention, an apparatus for estimating the rate at which carbon dioxide is generated in an enclosed space is provided. The apparatus includes a plurality of sensors. The sensors are configured to measure values of selected environmental variables in the enclosed space and generate signals representative of the values. The apparatus also includes a gas flow model circuit, operatively connected with the sensors, for receiving the signals from the sensors. The gas flow model circuit generates an estimated carbon dioxide generation rate value as a function of the values. Based on the carbon dioxide generation rate value, one may estimate whether a human is present in the enclosed space, how many humans are present in the enclosed space, and the amount of bodily heat being generated by humans in the enclosed space.

According to another aspect of the present invention, a method for determining the rate at which a gas is generated in an enclosed space is provided. The method includes the steps of measuring values of selected environmental variables in the enclosed space, and generating signals representative of the values. The method further includes the steps of transmitting the signals to a gas flow model circuit, and causing the gas flow model circuit to generate an estimated gas generation rate value as a function of the values of the selected environmental variables.

According to yet another aspect of the present invention, a building control system is provided. The building control system includes a plurality of sensors disposed to sense values of specified environmental variables in an enclosed space, and a controller, operatively connected with the plurality of sensors configured to receive the values from the plurality of sensors and generate control signals responsive to the values. The controller includes an interface circuit operatively connected with the plurality of sensors, and a gas flow model circuit operatively connected with the interface circuit. The gas flow model circuit is configured to receive the values from the plurality of sensors through the interface circuit. The gas flow model circuit is further configured to generate, responsive to the values, an estimated gas generation rate value representative of the rate at which a gas is generated in the enclosed space.

The controller further includes processing and control means operatively connected with the gas flow model. The processing and control means includes a memory. The processing and control means is configured to receive the estimated gas generation rate value from the gas flow model circuit, to process the estimated gas generation value according to instructions stored in the memory, and to generate the control signals responsive to the estimated gas generation value.

BRIEF DESCRIPTION OF THE DRAWINGS

The features of the present invention, which are believed to be novel, are set forth with particularity in the appended claims. The invention, together with further features and advantages thereof, may best be understood by making reference to the following description taken in conjunction with the accompanying drawings, in the several figures of which like reference numerals identify like elements, and wherein:

DETAILED DESCRIPTION OF THE PREFERRED EMBODIMENT

Air is composed of a variety of gasses. The ratio of the mass of a particular gas to the total mass of the volume of air in which it is contained is referred to as the concentration of that gas in the given volume of air. When a human in an enclosed space breaths, carbon dioxide is generated. As a result of humans breathing in the enclosed space, the concentration of carbon dioxide in the enclosed space increases. The more people breathing in a room, the higher the rate of carbon dioxide generation, and the greater the rate at which the carbon dioxide concentration in the room increases. Hence, the rate at which the carbon dioxide concentration in a room increases can serve as an indication of how many people are in the room.

However, other factors also affect the rate at which the carbon dioxide concentration in a room increases. For example, air may be entering the room from the outside. If the concentration of carbon dioxide in the incoming air differs from the concentration of the carbon dioxide in the room, then the introduction of the incoming air will affect the carbon dioxide concentration in the room. The rate of change in carbon dioxide concentration in the room attributable to the incoming air depends on the concentration of carbon dioxide in the incoming air and the rate at which incoming air is entering the room. Hence, in order to accurately predict the rate at which carbon dioxide is being generated in a room, and therefore accurately estimate the amount of humans in the room, one must know more than the rate at which the carbon dioxide concentration in the room is changing.

To accurately estimate the rate at which carbon dioxide is being generated in an enclosed space, the presently preferred embodiment of the invention implements a model of the dynamics of the diffusion and convection of carbon dioxide in the enclosed space which takes into account the flow rate and carbon dioxide concentration of incoming air, as well as the rate at which the carbon dioxide concentration in the enclosed space is changing.

Various equations shall be used herein to describe the relationships between the parameters used by the model implemented in the present invention. In such equations, the following symbols and meanings shall be used:

$\dot{m}_{gen}$ is the rate at which carbon dioxide is being generated within the enclosed space;

m is the mass of carbon dioxide in the enclosed space;

$\dot{m}$ is the rate of change of the mass of carbon dioxide in the enclosed space (m);

$m_{in}$ is the mass of the carbon dioxide in the incoming air;

$\dot{m}_m$ is the rate of change of the mass of the carbon dioxide in the incoming air ($m_{in}$);

$m_{out}$ is the mass of the carbon dioxide in the outgoing air;

$\dot{m}_{out}$ is the rate of change of the mass of the carbon dioxide in the outgoing air ($m_{out}$);

M is the total mass of air in the enclosed space;

$M_{in}$ is the total mass of the incoming air;

$\dot{M}_{in}$ is the mass flow rate of the incoming air ($M_{in}$); and $M_{out}$ is the total mass of the outgoing air;

$\dot{M}_{out}$ is the rate at which mass is flowing out of the enclosed space.

x is the concentration of carbon dioxide in the enclosed space (m/M);

$\dot{x}$ is the time rate of change of the concentration of carbon dioxide in the enclosed space (x);

$x_{in}$ is the mass concentration of carbon dioxide in the incoming air; and $x_{out}$ is the mass concentration of carbon dioxide in the outgoing air.

The model implemented by the presently preferred embodiment of the invention assumes that:

(1) concentration distribution within the enclosed space is spatially uniform;

(2) the mass of carbon dioxide in the enclosed space is much smaller than the total mass of the enclosed space; and (3) temperature and pressure fluctuations within the enclosed space are negligible.

The model implemented by the preferred embodiment of the invention is based on the law of the conservation of mass. According to the law of the conservation of mass, the rate of change of the mass of carbon dioxide in the enclosed space ($\dot{m}$) is equal to the rate of change of the mass of the carbon dioxide in the incoming air ($\dot{m}_{in}$) minus the rate of change of the mass of the carbon dioxide in the outgoing air ($\dot{m}_{out}$) plus the rate at which carbon dioxide is being generated within the enclosed space ($\dot{m}_{gen}$). This relationship is shown in Equation 1.

$$\dot{m} = \dot{m}_{in} - \dot{m}_{out} + \dot{m}_{gen} \qquad (1)$$

By dividing both sides of Equation 1 by M, Equation 1 is transformed into Equation 2.

$$\dot{x} = \frac{\dot{M}_{in}}{M} x_{in} - \frac{\dot{M}_{out}}{M} x_{out} + \frac{1}{M} \dot{m}_{gen} \qquad (2)$$

Based on assumption 1 stated above, the mass concentration of carbon dioxide in the outgoing air ($x_{out}$) is equal to the concentration of carbon dioxide in the enclosed space (x). Based on assumptions 2 and 3, M is constant, and the mass flow rate of the incoming air ($\dot{M}_{in}$) equals the rate at which mass is flowing out of the enclosed space ($\dot{M}_{out}$). Incorporating these assumptions into Equation 2 yields Equation 3.

$$M\dot{x} - \dot{m}_{gen} = \dot{M}_{in}(x_{in} - x) \qquad (3)$$

Thus, the rate at which carbon dioxide is being generated within the enclosed space ($\dot{m}_{gen}$) may be estimated based on the time rate of change of the concentration of carbon dioxide in the enclosed space ($\dot{x}$), the total mass of air in the enclosed space (M), the mass flow rate of the incoming air ($\dot{M}_{in}$), the mass concentration of carbon dioxide in the incoming air ($x_{in}$), and the concentration of carbon dioxide in the enclosed space (x). The mass concentration of carbon dioxide in the incoming air ($x_{in}$) and the concentration of carbon dioxide in the enclosed space (x) are typically measurable. The time rate of change of the concentration of carbon dioxide in the enclosed space ($\dot{x}$) may either be measurable or accurately approximated based on the measurements of the concentration of carbon dioxide in the enclosed space (x). Thus, Equation 3 is a linear regression on the two remaining variables, the total mass of air in the enclosed space (M) and the rate at which carbon dioxide is being generated within the enclosed space ($\dot{m}_{gen}$).

Most buildings consist of a number of interconnected enclosures, and cannot, in general, be modeled as a large, single enclosure. A gas generation rate model for multiple-enclosures is shown as Equation 4, where M is a diagonal mass matrix, $\underline{x}$ is the mass concentration state vector, $\underline{\dot{x}}$ is the time rate of change for the mass concentration, $\underline{\dot{M}}$ is the mass flow rate matrix, $\underline{\dot{m}}_{in}$ is the mass flow vector of inlet air, $\underline{x}_{in}$ is the concentration of the inlet air, and $\underline{\dot{m}}_{gen}$ is the gas source strength vector.

$$M\underline{\dot{x}} = \underline{\dot{M}}\underline{x} + \underline{\dot{m}}_{in}\underline{x}_{in} + \underline{\dot{m}}_{gen} \qquad (4)$$

The relationships expressed in Equations 3 and 4 model the gas transport dynamics in a building in continuous time. However, the preferred embodiment of the present invention implements these models on one or more programmed digital controllers. Such controllers perform operations at discrete time intervals on discrete data values. Therefore, discrete-time equivalents of these equations must be derived for digital implementation.

Many approaches for discretizing linear, continuous-time systems have been developed. This topic is covered extensively in Oppenheim, A. V. and R. W. Schafer (1989), *Discrete-Time Signal Processing*, Prentice Hall, Englewood Cliffs, N.J., and Franklin, G. F., J. D. Powell, and M. L. Workman (1990), *Digital Control of Dynamic Systems*, Addison-Wesley, Reading, Mass.

In the preferred embodiment of the invention, the concentration of carbon dioxide in the enclosed space (x) and the mass concentration of carbon dioxide in the incoming air ($x_{in}$) are sampled by a single sensor, and the discrete model shown in Equation 5 is implemented, where $\tau$ means the sampling time, n is a given time interval, n−1 is the time interval previous to n, and n−2 is the time interval previous to n−1.

$$\frac{1}{2\tau}(x(n) - x(n-2)) = \qquad (5)$$

$$\frac{\dot{M}_{in}}{M}\left(x_{in}(n-1) - \frac{1}{2}(x(n) + x(n-2))\right) + \frac{1}{M}\dot{m}_{gen}(n-1)$$

The discrete model expressed in Equation 5 is similar to that which would be derived from Equation 3 using the method commonly known as Tustin's approximation, or bilinear transformation.

Using the relationships shown in Equation 5, the rate at which carbon dioxide is being generated within the enclosed space ($\dot{m}_{gen}$ at time n−1) may be estimated by a discrete-time controller based on the concentration of carbon dioxide in the enclosed space (x as measured at times n and n−2), the total mass of the air in the enclosed space (M), the mass flow rate of the incoming air ($\dot{M}_{in}$), the mass concentration of carbon dioxide in the incoming air ($x_{in}$ measured at time n−1), and the sampling time ($\tau$). Since the rate at which carbon dioxide is being generated within the enclosed space ($\dot{m}_{gen}$) is the parameter of interest, it will always be unknown. However, one or more of the other parameters of Equation 5 may also be unknown. When such is the case, the unknown parameters must be estimated in order to determine the rate at which carbon dioxide is being generated within the enclosed space ($\dot{m}_{gen}$). Several approaches to recursively estimate parameters are described in Astrom, K. and B. Wittenmark (1990), *Adaptive Control*, Addison-Wesley, Reading, Mass., Goodwin, G. C. and K. S. Sin (1984), *Adaptive Filtering Prediction and Control*, Prentice-Hall, Englewood Cliffs, 1984, and Ljung, L. and T. Soderstrom (1983), *Theory and Application of Recursive Identification*, MIT Press, Cambridge, Mass. Common estimation methods include, for example, weighted least squares methods, exponentially forgetting weighted least squares methods, covariance modification or resetting methods, and Kalman filter estimates.

Parameter estimation methods typically require the air flow model to be placed in the form shown in Equation 6.

$$y(n) = \phi^T(n)\theta \qquad (6)$$

The scalar process model described in Equation 5 can be written in the form of Equation 6 three ways, depending on which parts of the model are unknown. When both the mass flow rate of the incoming air ($\dot{M}_{in}$) and the total mass of the air in the enclosed space (M) are known, Equation 5 is placed in the form shown in Equation 6 according to the relationships shown in Equations 7-9.

$$y(n) = \frac{M}{2\tau}(x(n) - x(n-2)) - \qquad (7)$$

$$\dot{M}_{in}\left(x_{in}(n-1) - \frac{x(n) + x(n-2)}{2}\right)$$

$$\phi(n) = 1 \qquad (8)$$

$$\theta = \dot{m}_{gen} \qquad (9)$$

When the total mass of the air in the enclosed space (M) is known but the mass flow rate of the incoming air ($\dot{M}_{in}$) is unknown, Equation 5 is placed in the form shown in Equation 6 according to the relationships shown in Equations 10-12.

$$y(n) = \frac{M}{2\tau}(x(n) - x(n-2)) \qquad (10)$$

$$\phi^T(n) = \left[\left(x_{in}(n-1) - \frac{x(n) + x(n-2)}{2}\right); 1\right] \qquad (11)$$

$$\theta^T = [\dot{M}_{in}, \dot{m}_{gen}] \qquad (12)$$

Finally, when the total mass of the air in the enclosed space (M) is unknown but the mass flow rate of the incoming air ($\dot{M}_{in}$) is known, Equation 5 is placed in the form shown in Equation 6 according to the relationships shown in Equations 13-15.

$$y(n) = \frac{1}{2\tau}(x(n) - x(n-2)) \qquad (13)$$

$$\phi^T(n) = \left[\dot{M}_{in}\left(x_{in}(n-1) - \frac{x(n) + x(n-2)}{2}\right) : 1\right] \qquad (14)$$

$$\theta^T = \left[\frac{1}{M} \quad \frac{\dot{m}_{gen}}{M}\right] \qquad (15)$$

Figure 4:
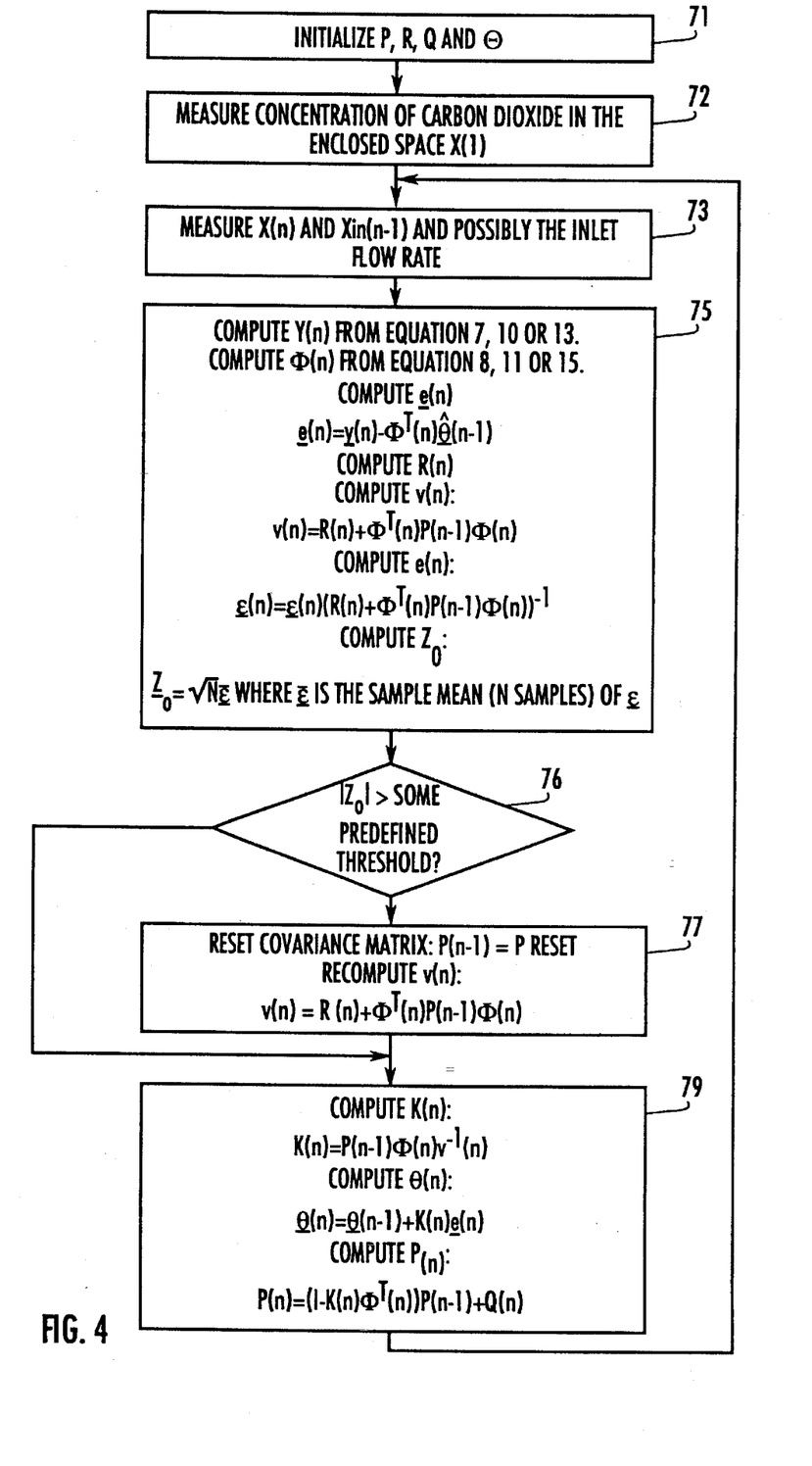
FIG. 4 is a block diagram of an algorithm for determining the rate of gas generation when parameters must be estimated.

A block diagram for one algorithm which recursively estimates unknown parameters used in the determination of the rate at which carbon dioxide is being generated within the enclosed space ($\dot{m}_{gen}$) is shown in FIG. 4. With reference to FIG. 4, n is incremented after measuring both inlet concentration and room concentration. As shown in step 71 the first step is initializing, using statistical techniques, $\underline{\theta}$ and matrices P, R and Q, which-represent a vector representing a process parameter (mass or flow rate) and the rate of $CO_2$ generation, the covariance matrix, the covariance matrix of the measurement noise, and covariance matrix of the variation of the parameters.

After the initialization is complete, the concentration of carbon dioxide in the enclosed space (x(1)) is measured, as shown by step 72. Then the mass concentration of carbon dioxide in the enclosed space and incoming air at times n and n−1, respectively (x(n), $x_{in}$(n−1) (and the inlet flow rate in one embodiment) are measured in step 73.

Next, as shown by step 75, a number of calculations are carried out. First, y(n) is computed using one of Equations 7, 10 or 13 above. Also, $\phi(n)$ is computed using one of Equations 8, 11 or 15 above. A computation to determine $\underline{e}(n)$, which defines the properties of innovations, based on:

$$\underline{e}(n) = \underline{y}(n) - \underline{\phi}^T(n)\hat{\underline{\theta}}(n-1) \qquad (16)$$

is also carried out in step 75.

R(n), which is the covariance matrix of the prediction denoted as y(n) is computed in step 75. In accordance with the invention R(n) is a scalar which represents the square of the standard deviation of the noise in y(n). Thus, R(n) is related to the noise in the time varying concentration measurements of x(n) and $x_{in}$(n). Therefore, R(n) must be estimated continually, and is done so in the following way. If $$\chi^{measured} = \chi^{actual} + \zeta \qquad (17)$$

$$\chi_{in}^{measured} = \chi_{in}^{actual} + \zeta_{in} \qquad (18)$$

then when both the mass flow rate of the incoming air ($\dot{M}_{in}$) and the total mass of the air in the enclosed space (M) are known the following equation for y(n) is true:

$$y(n) = \frac{M}{2\tau}(\chi^{actual}(n) - \chi^{actual}(n-2)) - \qquad (19)$$

$$\dot{M}\left(\chi_{in}^{actual}(n-1) - \frac{1}{2}(\chi^{actual}(n) + x^{actual}(n-2))\right) +$$

$$\frac{M}{2\tau}(\zeta(n) - \zeta(n-2)) -$$

$$\dot{M}\left(\zeta_{in}(n-1) - \frac{1}{2}(\zeta(n) + \zeta(n-2))\right)$$

Denoting the variances of x and $x_{in}$ as $\sigma^2$ and $\sigma_{in}^2$, respectively, then the variance of y is $$\sigma_y^2 = \frac{M_z}{\tau}\sigma^2 + \dot{M}(\sigma_{in}^2 + \sigma^2) \qquad (20)$$

Since the actual values of $\sigma^2$ and $\sigma_{in}^2$ are not known and vary with time, x and $x_{in}$ are filtered using the following two equations so that only the noise is left.

$$\zeta(n) = x^{measured}(n) - 3x^{measured}(n-2) + 3x^{measured}(n-4) - x^{measured}(n-6) \qquad (21)$$

$$\zeta_{in}(n-1) = x_{in}^{measured}(n-1) - 3x_{in}^{measured}(n-3) + 3x_{in}^{measured}(n-5) - x_{in}^{measured}(n-7) \qquad (22)$$

This filter has the effect of stripping the trend from x and $x_{in}$. The variance of $x_{in}$ is estimated as follows:

$$\hat{\sigma}^2_{in}(n-1) = \hat{\sigma}^2_{in}(n-3) + \qquad (23)$$

$$\frac{p_{in}(n-3)}{\lambda(n-1) + p_{in}(n-3)}(\zeta_{in}(n-1) - \hat{\sigma}^2_{in}(n-3))$$

$$p_{in}(n-1) = \frac{p_{in}(n-3)}{\lambda(n) + p_{in}(n-3)} \qquad (24)$$

where typical values for $\lambda(n-1)$ and $p_{in}(0)$ are 0.99 and 1,000,000, respectively. The initial value of the estimate of $\sigma_{in}^2$ should be a representative value for the type of sensor used. Because $\sigma^2$ jumps when the source jumps, a covariance resetting algorithm for estimating $\sigma^2$ is used. The F-statistic with $1/p(n-2)$ degrees of freedom is used for detecting a jump in the variance. If $\zeta(n-1)$ is above the $1-\alpha/2$ of the F-distribution or below the $\alpha/2$ percentile, then $p(n-2)$ is reset to 1.0 and the following calculation is performed:

$$\hat{\sigma}^2(n) = \hat{\sigma}^2(n-2) + \frac{p(n-2)}{\lambda(n)+p(n-2)}(\zeta(n)-\hat{\sigma}^2(n-2)) \quad (25)$$

$$p(n) = \frac{p(n-2)}{\lambda(n)+p(n-2)} \quad (26)$$

The variance of y is estimated by substituting into Equation 20 the estimated variances of x and $x_{in}$. The same procedure can be applied to the cases when M is known but $\dot{M}_{in}$ is unknown and when M is unknown but $\dot{M}_{in}$ is known.

Additionally $v(n)$ and $\epsilon(n)$ are computed in step 75 from the following equations:

$$v(n)=R(n)+\underline{\phi}^T(n)P(n-1)\underline{\phi}(n) \quad (27)$$

$$\underline{\epsilon}(n)=\underline{e}(n)(R(n)+\underline{\phi}^T(n)\ P(n-1)\underline{\phi}(n))^{-1} \quad (28)$$

Finally, in step 75 $Z_0$ is computed from $Z_0=(\sqrt{N})\overline{\epsilon}$ where $\overline{\epsilon}$ is the sample mean (using N samples) of $\epsilon$.

After the computations of step 75 are completed a test for a significant change in the parameters based on the mean, variance or auto-correlation function of innovations is performed in step 76.

If $|Z_0|$ is greater than a predefined threshold (i.e. a significant change) then the covariance matrix P is reset, as shown in step 77, where $P(n-1)=P$ reset. After the covariance matrix is reset $v(n)$ is recomputed using:

$$v(n)=R(n)+\underline{\phi}^T(n)P(n-1)\underline{\phi}(n) \quad (29)$$

After $v(n)$ is recomputed the gain matrix, $K(n)$ is computed in step 79. Also, if $|Z_0|$ was determined to be less than the predefined threshold (i.e. no significant change) then step 77 is omitted and $K(n)$ is computed in step 79. In either case $K(n)$ is calculated using:

$$K(n)=P(n-1)\underline{\phi}(n)v^{-1}(n) \quad (30)$$

Also in step 79 $\hat{\underline{\theta}}(n)$ and the covariance matrix $P(n)$ are computed using the following equations:

$$\hat{\underline{\theta}}(n)=\hat{\underline{\theta}}(n-1)+K(n)\underline{e}(n) \quad (31)$$

$$P(n)=(I-K(n)\underline{\phi}^T(n))P(n-1)+Q(n) \quad (32)$$

After completing these computations step 73 is repeated, and new values for the mass concentration of carbon dioxide in the enclosed space and incoming air at times n and n−1, respectively $(x(n), x_{in}(n-1))$ (and the inlet flow rate in one embodiment) are measured. Thus, the unknown parameters are estimated recursively for use in determining the rate at which carbon dioxide is being generated within the enclosed space.

Figure 1:
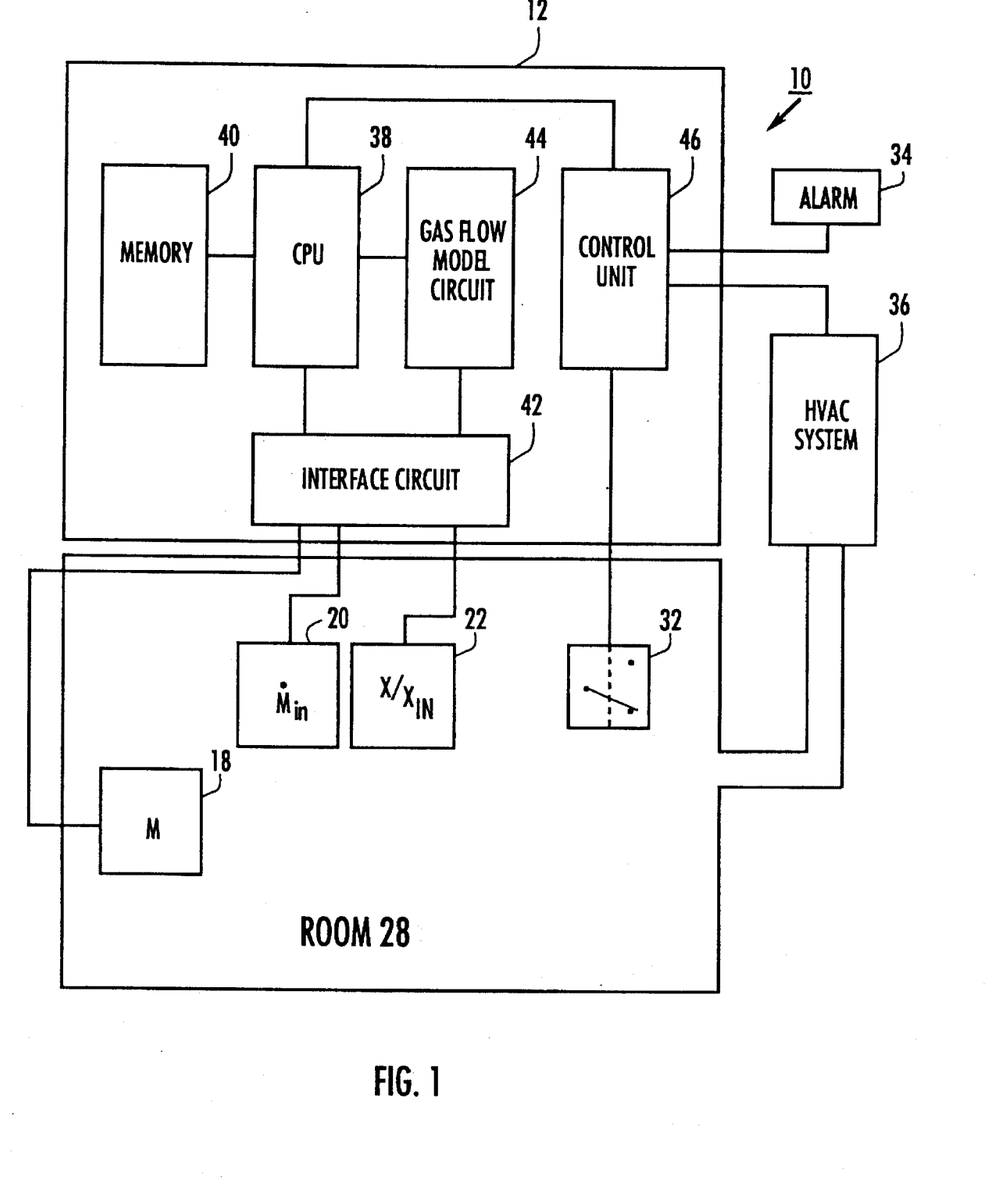
FIG. 1 illustrates in block diagram form an environmental and security control system according to the present invention.

Referring now to FIG. 1, it illustrates in block diagram form one embodiment of a building control system 10 according to the present invention. Building control system 10 generally includes a controller 12 connected to a plurality of sensors 18, 20, and 22, each of which is disposed to measure an environmental variable within a room 28. The controller 12 is also connected to a light switch 32, an alarm 34 and an HVAC system 36.

Controller 12 generally includes a CPU 38 which is connected to a memory 40, an interface circuit 42, a gas flow model circuit 44, and a control unit 46. Interface circuit 42 is also connected to the plurality of sensors 18, 20, and 22, and to gas flow model circuit 44. Control unit 46 is connected to alarm 34, HVAC system 36, and light switch 32.

Interface circuit 42 receives signals representative of the values of environmental variables within room 28 from sensors 18, 20, and 22. Specifically, sensor 18 is configured to sense the total mass of the air in room 28 (M) and to send a signal indicative of the total mass of air within room 28 (M) to interface circuit 42. Sensor 20 is configured to sense the mass flow rate of the incoming air $(\dot{M}_{in})$ and transmit a signal indicative of the mass flow rate of the incoming air $(\dot{M}_{in})$ to interface circuit 42. Sensors 18 and 20 are described herein as single sensors. However, sensors 18 and 20 may measure multiple environmental variables to determine M and $\dot{M}_{in}$, respectively. For example, sensor 18 may determine M based on ideal gas relationships and measurements of the nominal temperature and pressure of the air in room 28, and the measured volume of room 28. Sensors 18 and 20 are optional, in that building control system 10 may operate without one of either sensor 18 or sensor 20, since one of the values sensed by these sensors (the total mass of air within room 28 (M) or the mass flow rate of the incoming air $(\dot{M}_{in})$) may be estimated using a parameter estimation method as described above.

Sensor 22 is a multiplexing sensor and includes a low dead volume solenoid valve and is configured to sense both the concentration of carbon dioxide in room 28 (x) and the inlet mass concentration of carbon dioxide in room 28 $(x_{in})$, and to send a signal representative of these variables to interface circuit 42 at alternating time intervals. Specifically, sensor 22 is a nondispersive infrared sensor that sends a signal representative of the concentration of carbon dioxide in room 28 (x) (preferably measured at the exhaust point) to interface circuit 42 at times n=1, 3, 5 . . . , and sends a signal representative of the mass concentration of carbon dioxide in the incoming air $(x_{in})$ to interface circuit 42 at times n=0, 2, 4 . . . While the concentration of carbon dioxide in room 28 (x) and the mass concentration of carbon dioxide in the incoming air $(x_{in})$ may alternatively be sensed with two separate sensors, use of a single sensor is preferred to reduce the cost of building control system 10 and to alleviate drift or zero errors to which many gas sensors are prone. In one embodiment a draw through configuration is used.

Interface circuit 42 processes the signals received from the sensors and converts these signals into a form usable by the gas flow model circuit 44. Interface circuit 42 may include amplifiers, anti-aliasing filters, and analog to digital converters to allow the signals from the sensors to be processed by gas flow model circuit 44.

Gas flow model circuit 44, at pre-defined time intervals, calculates a value for the rate at which carbon dioxide is being generated within the enclosed space $(\dot{m}_{gen})$ based on input from sensors 18, 20, and 22 according to the relationships expressed in Equation 3. Gas flow model circuit 44 is preferably a digital circuit, such as a processor, programmed to implement a discrete equivalent to Equation 3, such as Equation 5. The specific relationships used to implement the model expressed by Equation 3 may be either those expressed in Equations 7–9, those expressed in Equations 10–12, or those expressed in Equations 13–15, depending on whether the total mass of air within room 28 (M) and the mass flow rate of the incoming air $(\dot{M}_{in})$ are known or unknown. The general process steps for determining the rate at which carbon dioxide is being generated within room 28 $(\dot{m}_{gen})$ will be described below in greater detail with reference to FIG. 2. Once gas flow model circuit 44 has estimated the rate at which carbon dioxide is being generated within room 28 ($\dot{m}_{gen}$), gas flow model circuit 44 transmits the estimated value of the rate at which carbon dioxide is being generated within room 28 ($\dot{m}_{gen}$) to CPU 38.

CPU 38 is configured to operate in accordance with instructions it retrieves from memory 40. The operations defined by the instructions contained in memory 40 depend on the specific application to which controller 12 is put. According to one embodiment of the invention, controller 12 is part of a security system that activates an alarm when someone enters room 28. Under such circumstances, CPU 38 compares the value of the rate at which carbon dioxide is being generated within room 28 ($\dot{m}_{gen}$) to a predetermined threshold value. The predetermined threshold value is a value which reflects the expected amount of carbon dioxide generation within room 28 when room 28 is unoccupied (e.g. zero or near-zero). When the rate at which carbon dioxide is being generated within room 28 ($\dot{m}_{gen}$), as estimated by gas flow model circuit 44, is greater than the predetermined threshold value, CPU 38 sends a signal to control unit 46 to cause control unit 46 to activate alarm 34.

Alternatively, the predetermined threshold value may be a value representative of the expected carbon dioxide generation rate of a specified number of people. For example, the predetermined threshold rate may be set at (or slightly above) the expected carbon dioxide generation rate of one person. Thus configured, a person may be able to work in room 28 without causing an alarm to be activated. However, if a second individual enters room 28, the alarm will sound. In domestic environments, the threshold value may be suitably set so that an alarm is not accidentally activated by the carbon dioxide generation of pets. In other applications the predetermined threshold rate may also be set at (or slightly above) the expected carbon dioxide generation rate of multiple people so that an alarm will sound if not enough people are present in the room. Alternatively, instead of sounding an alarm, a signal could be sent to disable dangerous equipment if not enough people were in the room.

Figure 2:
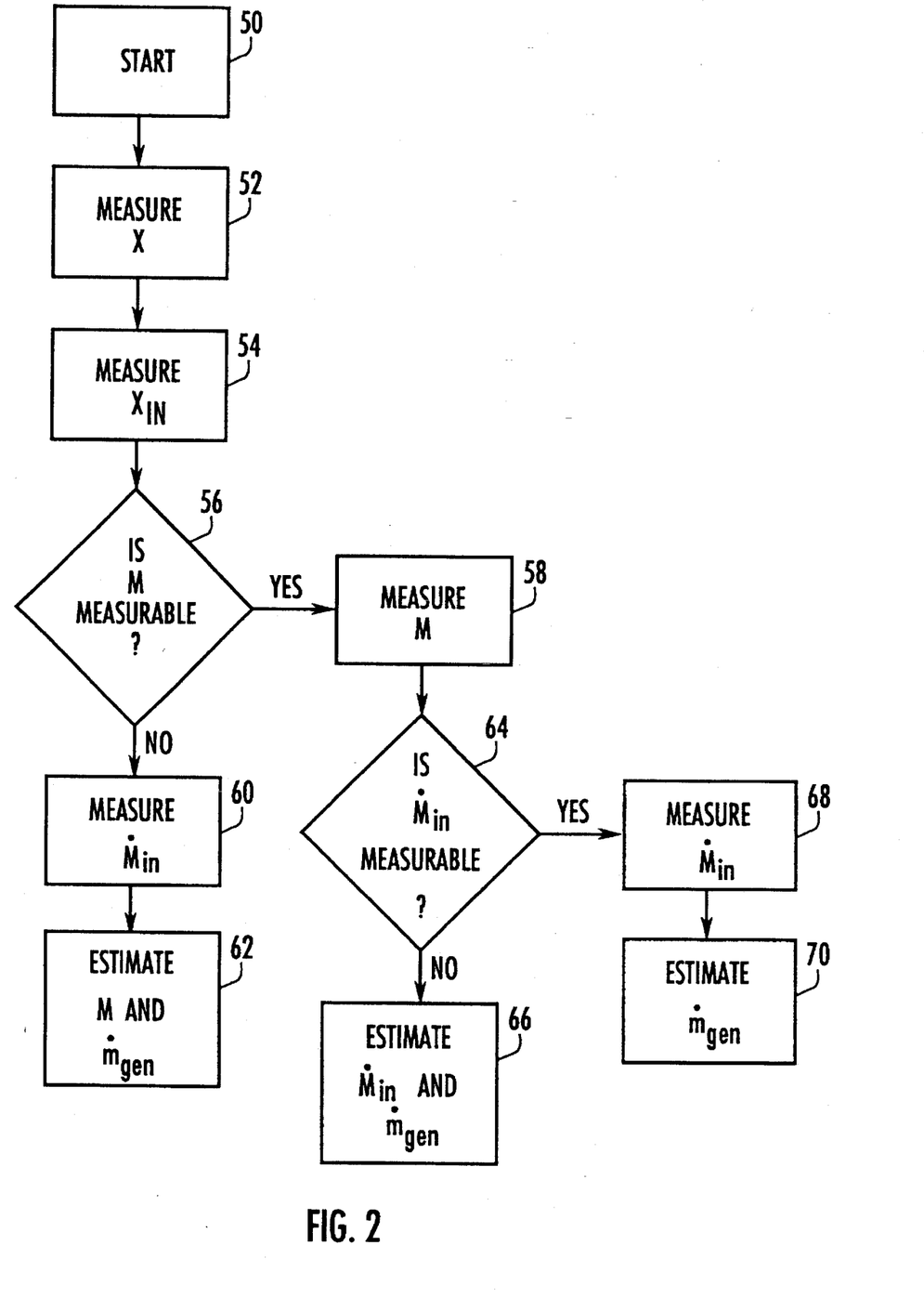
FIG. 2 is a control flow diagram illustrating the general process steps for estimating the amount of carbon dioxide generated in an enclosed space.

Referring now to FIG. 2, it illustrates a control flow diagram illustrating the general process steps for estimating the amount of carbon dioxide generated in an enclosed space. The process, initiated at block 50, is preferably performed repetitively by gas flow model circuit 44 at predefined time intervals. At block 52, the concentration of carbon dioxide in the enclosed space (x) is measured. At block 54, the mass concentration of carbon dioxide in the incoming air ($x_{in}$) is measured. While FIG. 2 shows the concentration of carbon dioxide in the enclosed space (x) and the mass concentration of carbon dioxide in the incoming air ($x_{in}$) being measured sequentially, these values are preferably measured at alternating time intervals, as described above.

At block 56, it is determined whether the total mass of air within the enclosed space (M) is measurable (i.e. whether the system implementing the process includes a sensor for acquiring data indicative of M). If the total mass of air within the enclosed space (M) is not measurable, the mass flow rate of the incoming air ($\dot{M}_{in}$) is measured at block 60, and the total mass of air in the enclosed space (M) and the rate at which carbon dioxide is being generated within the enclosed space ($\dot{m}_{gen}$) are estimated at block 62. Since the total mass of air in the enclosed space (M) is unknown, the total mass of air in the enclosed space (M) and the rate at which carbon dioxide is being generated within the enclosed space ($\dot{m}_{gen}$) are preferably estimated based on the relationships expressed in Equations 13–15.

If the total mass of air in the enclosed space (M) is measurable, then control proceeds from block 56 to block 58, where the total mass of air in the enclosed space (M) is measured. At block 64, it is determined whether the mass flow rate of the incoming air ($\dot{M}_{in}$) is measurable.

If the mass flow rate of the incoming air ($\dot{M}_{in}$) is not measurable, control passes to block 66, where the mass flow rate of the incoming air ($\dot{M}_{in}$) and the rate at which carbon dioxide is being generated within the enclosed space ($\dot{m}_{gen}$) are estimated. Since the mass flow rate of the incoming air ($\dot{M}_{in}$) is unknown, the mass flow rate of the incoming air ($\dot{M}_{in}$) and the rate at which carbon dioxide is being generated within the enclosed space ($\dot{m}_{gen}$) are preferably estimated based on the relationships expressed in Equations 10–12. If the mass flow rate of the incoming air ($\dot{M}_{in}$) is measurable, the mass flow rate of the incoming air ($\dot{M}_{in}$) is measured at block 68, and the rate at which carbon dioxide is being generated within the enclosed space ($\dot{m}_{gen}$) is estimated at block 70. Since both the total mass of air in the enclosed space (M) and the mass flow rate of the incoming air ($\dot{M}_{in}$) have been measured prior to block 70, the rate at which carbon dioxide is being generated within the enclosed space ($\dot{m}_{gen}$) is estimated based on the relationships expressed in Equations 7–9.

Referring again to FIG. 1, according to another embodiment of the invention, CPU 38 compares the value of the rate at which carbon dioxide is being generated within room 28 ($\dot{m}_{gen}$) to the predetermined threshold value indicative of an unoccupied room, as described above, but rather than activate an alarm, CPU 38 controls the lighting within room 28 responsive to the outcome of the comparison. Specifically, when the previous estimate of the rate at which carbon dioxide is being generated within room 28 ($\dot{m}_{gen}$) was below the threshold, and the current estimate is above the threshold, then someone has just entered room 28. When this occurs, CPU 38 sends a signal to control unit 46 to cause control unit 46 to activate light switch 32. Consequently, when a human enters unoccupied room 28, the lighting in the room will turn on. CPU 38 continues to compare the repetitively generated estimated rate at which carbon dioxide is being generated within room 28 ($\dot{m}_{gen}$) to the threshold value at predetermined intervals. The rate at which carbon dioxide is being generated within room 28 ($\dot{m}_{gen}$) will again fall below the predetermined threshold when the last occupant of room 28 exits room 28. When CPU 38 determines that the present rate at which carbon dioxide is being generated within room 28 ($\dot{m}_{gen}$) is below the threshold value, when the previous rate at which carbon dioxide was generated within room 28 ($\dot{m}_{gen}$) was above the threshold value, CPU 38 sends a signal to control unit 46 to cause control unit 46 to deactivate light switch 32, causing the lights in room 28 to go off. In this embodiment of the invention, humans are saved the hassle and inconvenience of searching for light switches in unlighted rooms. In addition, substantial energy savings may be realized, since humans often fail to turn off the lights in a room when they exit.

According to another embodiment of the invention, switch 32 may control power to devices other than lights. For example, switch 32 may control power to one or more computer monitors within room 28. Thus configured, when a human is present in room 28, the monitors are activated, and when no humans are in room 28, the monitors are shut off. The particular devices controlled by switch 28 may therefore vary according to the specific requirements of each user and application.

According to yet another embodiment of the invention, CPU 38 divides the rate at which carbon dioxide is being generated within room 28 ($\dot{m}_{gen}$) by a value representative of the expected carbon dioxide generation rate of an average human. This yields a value indicative of the number of people currently occupying room 28. CPU 38 transmits this value to control unit 46. According to this embodiment, control unit 46 is configured to control HVAC system 36 according to a predetermined control strategy responsive to, among other factors, the number of people within room 28. Depending on the specific control strategy implemented by control unit 46, control unit 46 may be connected to sensors and interfaces not shown in FIG. 1.

The actual carbon dioxide generation rate of a person will vary based on factors such as the size of and activity level of the person. Therefore, the expected carbon dioxide generation rate per person may be chosen based on the expected use of the room. For example, if it is expected that people will be standing in the room, the rate of $1.0 \times 10^{-5}$ kg/s may be used, which rate represents the rate at which an average person generates carbon dioxide while standing.

To determine the value indicative of the number of people currently occupying room 28, CPU 38 may alternatively divide the rate at which carbon dioxide is being generated within room 28 ($\dot{m}_{gen}$) by a value representative of the lower bound rate at which a single human generates carbon dioxide. The resulting estimate will reflect the maximum possible number of people presently occupying room 28. This conservative method of estimating the number of people in room 28 is preferable when, for example, a minimum ventilation rate per person must be guaranteed.

Control unit 46 is a controller configured to control HVAC system 36 according to a predetermined control strategy. For example, control unit 46 may be configured to receive the signal indicative of the number of occupants in room 28, and to generate a control signal based on this number to cause HVAC system 36 to ventilate room 28 at an optimal outdoor flow rate. As mentioned above, the ASHRAE Standard 62-1989 states that the minimum outdoor flow rate should be 15 cfm/person. Because the present invention is able to estimate the number of people occupying room 28, this standard can be met through direct control, rather than simply through design based on occupancy assumptions.

In one embodiment of the present invention a temperature control system utilizing the above-described method and/or apparatus to determine the number of occupants in a room may be utilized with a control system to provide a feed forward calculation to compensate for the heat and/or humidity generated by the occupants.

Figure 3:
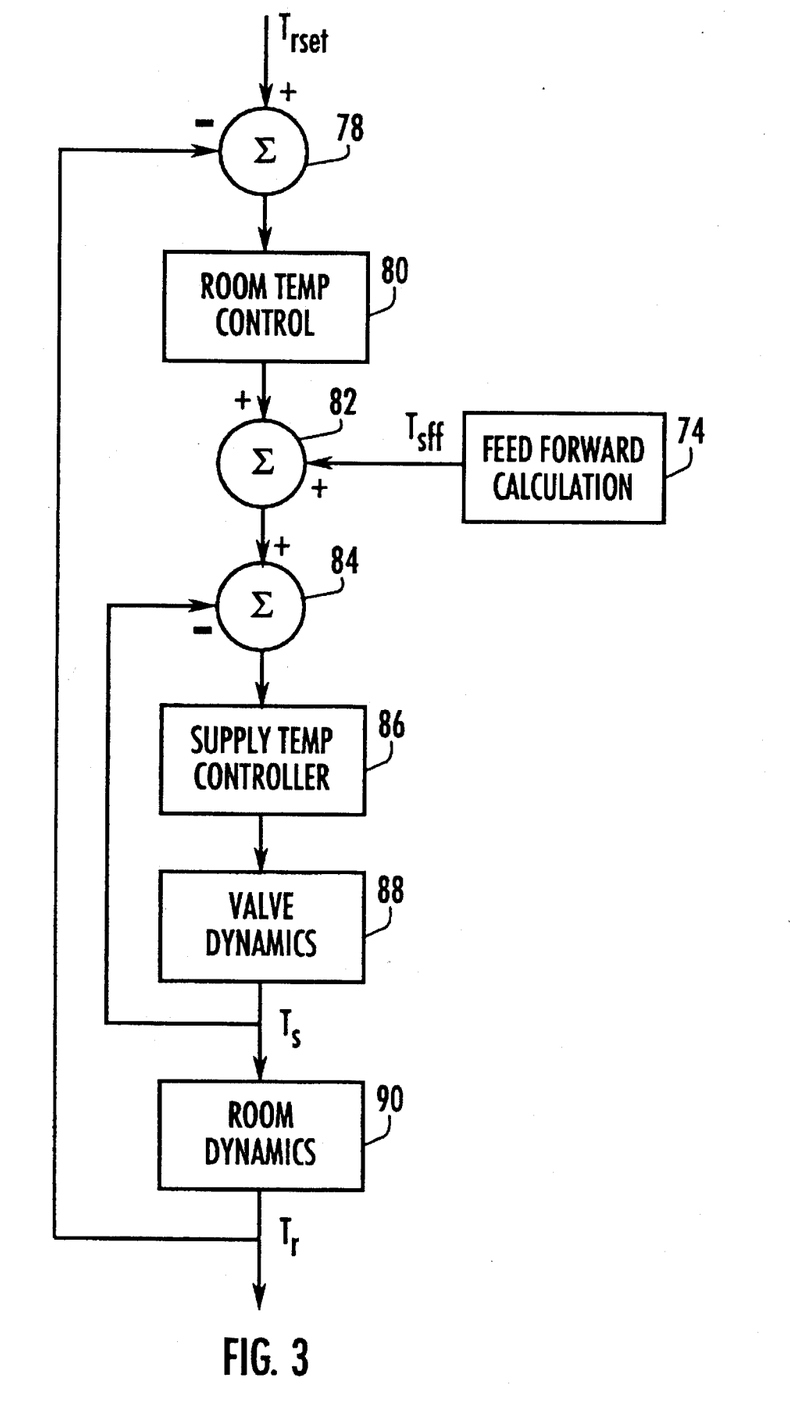
FIG. 3 is a schematic diagram of a room temperature control system for a constant volume system with reheat utilizing the feed forward calculation of the present invention.

Referring now to FIG. 3, a schematic diagram of a room temperature control for a constant volume system with reheat is shown. A desired temperature ($T_{rset}$) is provided as an input along with a supply temperature feed forward input ($T_{sff}$). The system senses the supply temperature ($T_s$) and room temperature ($T_r$). $T_r$ is subtracted from $T_{rset}$ at a summer 78. The feedback including $T_r$ rejects slowly varying load disturbances caused by diurnal changes in outdoor conditions and time varying loads in adjoining rooms.

The signal from summer 78 is provided to a room temperature controller 80, which outputs a signal indicative of the difference from summer 78. The output of room temperature controller 80 is summed with $T_{sff}$ at a summer 82 to provide a control signal which accounts for both the diurnal changes described above and the changes due to time variance in the number of occupants. As will be described below, the feed forward term ($T_{sff}$) compensates for abrupt changes in the number of occupants.

The output of summer 82 is provided to a summer 84 where $T_s$ is subtracted. Feedback of $T_s$ is provided to linearize the nonlinear behavior of the reheat valve. The output of summer 84 is provided to a supply temperature controller 86 which outputs a signal to control the reheat valve. A box 88 represents the valve dynamics, which include the non-linearities corrected for by feeding back $T_s$.

The output of valve dynamics box 88, $T_s$, is provided to a box 90 which represents the room dynamics. The output of box 90, $T_r$, is the temperature of the room, and is fed back to summer 78.

As stated above, the feed forward term ($T_{sff}$) compensates for abrupt changes in the number of occupants. The feed forward component of the supply temperature, $T_{sff}$, is $$T_{sff} = -\frac{Q_{ff}}{\dot{M}C_p}$$

where $Q_{ff}$ is the estimated convective heat transfer from the occupants, $\dot{M}$ is the mass flow rate, and $C_p$ is the specific heat of air at constant pressure. The number of occupants may be calculated as described above.

The value of $Q_{ff}$ is obtained from a model-based filter of the carbon dioxide measurements at the room inlet and outlet points. The following equation shows the relation between the carbon dioxide source strength and $Q_{ff}$ when it is assumed that the air flow is constant and the mean radiant temperature is equal to the air temperature:

$$Q_{ff} = 3.36 \times 10^6 \dot{m}_{gen}$$

where $Q_{ff}$ is in watts, $\dot{m}$ is in kg/s, the respiratory quotient (defined as the ration of carbon dioxide produced to oxygen consumed) is assumed to be 0.83, the ratio of sensible to latent heat generated by occupants is assumed to be 1.36, and the ratio of radiative to convective heat transfer is assumed to be 1.14. The ratio of radiative to convective heat transfer can be more accurately determined if the air flow rate and/or the mean radiant temperature is measured.

Combining the equation giving $T_{sff}$ and $Q_{ff}$ above, the feed forward component of the supply temperature is $$T_{sff} = 3.34 * 10^3 * \frac{\dot{m}_{gen}}{\dot{M}}$$

where $T_{sff}$ is in degrees celsius. The resulting value is used in a control system such as that of FIG. 3.

According to yet another embodiment of the invention, control unit 46 may be a controller configured to implement an adaptive control strategy based on the strategy described in U.S. Pat. No. 5,170,935. The adaptive control strategy described in U.S. Pat. No. 5,170,935 is responsive to, among other things, the bodily heat production within an enclosed space. Typically, bodily heat production must be estimated, since it would be extremely difficult and impractical to measure directly. In general, when one is active, one generates more heat and breaths harder. Conversely, when one is less active, one generates less heat and breaths less hard. Thus, the bodily heat production of an individual varies proportionally with the rate at which the individual is generating carbon dioxide. Hence, CPU 38 estimates the bodily heat production within room 28 based on the rate at which carbon dioxide is being generated within the enclosed space ($\dot{m}_{gen}$) and the number of people within room 28. In this embodiment of the invention, the actual number of people within room 28 must either be assumed, directly entered into CPU 38 through a user interface (not shown), or estimated by a method which is not based upon rate at which carbon dioxide is being generated within the enclosed space ($\dot{m}_{gen}$).

As is evident from the foregoing description, the present invention provides an apparatus and method for detecting the presence and number of humans in an enclosed space based on the amount of carbon dioxide being generated in the enclosed space. According to one aspect of the invention, the carbon dioxide generation rate is used to detect the presence of an intruder. Upon the detection of an intruder, an alarm is activated Alternately, other suitable actions may be taken, such as energizing a light on a security control panel.

According to another aspect of the invention, the estimated carbon dioxide generation rate is used to detect when a person enters an unoccupied room, and when the last person to occupy a room leaves the room. Upon detection that a person is entering an unoccupied room, the lights in the room are activated. Upon detection that the last person in a room has left the room, the lights in the room are deactivated.

According to another aspect of the invention, the estimated carbon dioxide generation rate and the number of people in a room are used to estimate the bodily heat production within the room. The bodily heat production estimation may then be used to determine and control the overall thermal comfort of the occupants in the room.

According to yet another aspect of the invention, the estimated carbon dioxide generation rate is used to estimate the number of people in a room to control the ventilation rate in the room. Thus, a minimum outdoor flow rate may be maintained without reliance on occupancy assumptions.

It should be noted that the aforestated aspects of the present invention are not mutually exclusive. Therefore, it is contemplated that building control systems may suitably combine two or more aspects of the present invention based on the specific needs of a given building or enclosure. In addition, it is to be understood that the detailed drawings and specific examples given describe preferred embodiments of the invention and are for the purpose of illustration, that the apparatus of the invention is not limited to the precise details and conditions disclosed, and that various changes may be made therein without departing from the spirit of the invention which is defined by the following claims.

What is claimed is:

1. An apparatus for estimating the rate at which a gas is generated in an enclosed space, comprising:
   a plurality of sensors configured to measure values of selected environmental variables in the enclosed space and generate signals representative of the values;
   a gas flow model circuit, operatively connected with the sensors, for receiving the signals from the sensors and generating an estimated gas generation rate value as a function of the values; and
   a control unit, operatively connected to the gas flow model circuit, for generating control signals as a function of the estimated gas generation rate.

2. The apparatus of claim 1 wherein the estimated gas generation rate value is an estimated carbon dioxide generation rate value indicative of the rate at which carbon dioxide is being generated within the enclosed space.

3. The apparatus of claim 1 further comprising an interface circuit operatively connected with the gas flow model circuit and the plurality of sensors, whereby the signals are passed through and processed by the interface circuit when the signals are sent from the plurality of sensors to the gas flow model circuit.

4. The apparatus of claim 1 wherein the plurality of sensors include means for measuring the concentration of the gas in the enclosed space (x) and the mass concentration of the gas in the incoming air ($x_{in}$), and a sensor for measuring one of either the total mass of air in the enclosed space (M) or the mass flow rate of the incoming air ($\dot{M}_{in}$).

5. The apparatus of claim 4 wherein the means for measuring the concentration of the gas in the enclosed space (x) and the mass concentration of the gas in the incoming air ($x_{in}$) includes a sensor for measuring the concentration of the gas in the enclosed space (x), and a sensor for measuring the mass concentration of the gas in the incoming air ($x_{in}$).

6. The apparatus of claim 4 wherein the means for measuring the concentration of the gas in the enclosed space (x) and the mass concentration of the gas in the incoming air ($x_{in}$) includes a single, multiplexed sensor for measuring the concentration of the gas in the enclosed space (x) and the mass concentration of the gas in the incoming air ($x_{in}$) during alternating time intervals.

7. The apparatus of claim 2 wherein the environmental variables include the concentration of carbon dioxide in the enclosed space (x), the mass concentration of carbon dioxide in the incoming air ($x_{in}$), and at least one of the total mass of air in the enclosed space (M) and the mass flow rate of the incoming air ($\dot{M}_{in}$).

8. The apparatus of claim 7 wherein the gas flow model circuit generates the estimated carbon dioxide generation rate value at predefined intervals, where n represents a given time interval, n–1 represents a time interval just prior to n, and n–2 represents the time interval just prior to n–1, wherein the estimated carbon dioxide generation rate value is generated based upon the relationships expressed in the equation:

$$\frac{1}{2\tau} (x(n) - x(n-2)) = \frac{\dot{M}_{in}}{M}\left( x_{in}(n-1) - \frac{1}{2}(x(n) + x(n-2)) \right) + \frac{1}{M} \dot{m}_{gen}(n-1)$$

where
$\dot{m}_{gen}$ is the rate at which carbon dioxide is being generated within the enclosed space;
M is the total mass of air in the enclosed space;
$\dot{M}_{in}$ is the mass flow rate of the incoming air;
x is the concentration of carbon dioxide in the enclosed space;
$x_{in}$ is the mass concentration of carbon dioxide in the incoming air;
$\tau$ means the time interval between one sampling and the next;
n is a specified sampling time;
n–1 is the sampling time previous to the sampling time represented by n; and
n–2 is the sampling time previous to the sampling time represented by n–1.

9. The apparatus of claim 2 wherein the gas flow model circuit generates the estimated carbon-dioxide generation rate value based upon the relationships expressed in the equation:

$$M\dot{x} - \dot{m}_{gen} = \dot{M}_{in}(x_{in} - x)$$

where
M is the total mass of air in the enclosed space;
$\dot{m}_{gen}$ is the rate at which carbon dioxide is being generated within the enclosed space;
x is the concentration of carbon dioxide in the enclosed space;
$\dot{x}$ is the time rate of change of x;
$x_{in}$ is the mass concentration of carbon dioxide in the incoming air; and $\dot{M}_{in}$ is the mass flow rate of the incoming air.

10. The apparatus of claim 9 wherein the signals are representative of the selected environmental variables measured at discrete time intervals, wherein the gas flow model circuit generates the estimated carbon-dioxide generation rate based upon the relationships expressed in the equation:

$$\frac{1}{2\tau}(x(n)-x(n-2)) =$$

$$\frac{\dot{M}_{in}}{M}\left(x_{in}(n-1)-\frac{1}{2}(x(n)+x(n-2))\right)+\frac{1}{M}\dot{m}_{gen}(n-1)$$

where $\dot{m}_{gen}$ is the rate at which carbon dioxide is being generated within the enclosed space;

M is the total mass of air in the enclosed space;

$\dot{M}_{in}$ the mass flow rate of the incoming air;

x is the concentration of carbon dioxide in the enclosed space;

$x_{in}$ is the mass concentration of carbon dioxide in the incoming air;

$\tau$ means the time interval between one sampling and the next;

n is a specified sampling time;

n–1 is the sampling time previous to the sampling time represented by n; and n–2 is the sampling time previous to the sampling time represented by n–1.

11. The apparatus of claim 10 wherein the plurality of sensors include means for measuring the concentration of carbon dioxide in the enclosed space (x) and the mass concentration of carbon dioxide in the incoming air ($x_{in}$), and a sensor for measuring one of either M or the mass flow rate of the incoming air ($\dot{M}_{in}$).

12. The apparatus of claim 11 wherein the means for measuring the concentration of carbon dioxide in the enclosed space (x) and the mass concentration of carbon dioxide in the incoming air ($x_{in}$) includes a sensor for measuring the concentration of carbon dioxide in the enclosed space (x), and a sensor for measuring the mass concentration of carbon dioxide in the incoming air ($x_{in}$).

13. The apparatus of claim 11 wherein the means for measuring the concentration of carbon dioxide in the enclosed space (x) and the mass concentration of carbon dioxide in the incoming air ($x_{in}$) includes a single, multiplexed sensor for measuring the concentration of carbon dioxide in the enclosed space (x) and the mass concentration of carbon dioxide in the incoming air ($x_{in}$) during alternating time intervals.

14. The apparatus of claim 10 wherein the plurality of sensors include means for measuring the concentration of carbon dioxide in the enclosed space (x) and the mass concentration of carbon dioxide in the incoming air ($x_{in}$), and a sensor for measuring the total mass of air in the enclosed space (M), the gas flow model circuit being configured to estimate the mass flow rate of the incoming air ($\dot{M}_{in}$) based on the concentration of carbon dioxide in the enclosed space (x), the mass concentration of carbon dioxide in the incoming air ($x_{in}$), and the total mass of air in the enclosed space (M).

15. The apparatus of claim 10 wherein the plurality of sensors include means for measuring the concentration of carbon dioxide in the enclosed space (x) and the mass concentration of carbon dioxide in the incoming air ($x_{in}$), and a sensor for measuring the mass flow rate of the incoming air ($\dot{M}_{in}$), the gas flow model circuit being configured to estimate the total mass of air in the enclosed space (M) based on the concentration of carbon dioxide in the enclosed space (x), the mass concentration of carbon dioxide in the incoming air ($x_{in}$), and the mass flow rate of the incoming air ($\dot{M}_{in}$).

16. The apparatus of claim 10 wherein the plurality of sensors include means for measuring the concentration of carbon dioxide in the enclosed space (x) and the mass concentration of carbon dioxide in the incoming air ($x_{in}$), and a sensor for measuring the total mass of air in the enclosed space (M), and a sensor for measuring the mass flow rate of the incoming air ($\dot{M}_{in}$).

17. A method for determining the rate at which a gas is generated in an enclosed space, comprising the steps of:

measuring values of selected environmental variables in the enclosed space;

generating signals representative of the values;

transmitting the signals to a gas flow model circuit;

causing the gas flow model circuit to generate an estimated gas generation rate value as a function of the values of the selected environmental variables; and generating control signals as a function of the estimated gas generation rate.

18. The method of claim 17 wherein the step of transmitting the signals to the gas flow model circuit includes the steps of:

transmitting the signals to an interface circuit;

causing the interface circuit to process the signals; and causing the interface circuit to transmit the signals to the gas flow model.

19. The method of claim 17 wherein the step of measuring values of selected environmental variables in the enclosed space comprises the steps of:

measuring the concentration of the gas in the enclosed space (x);

measuring the mass concentration of the gas in the incoming air ($x_{in}$); and measuring at least one of the total mass of air in the enclosed space (M) and the mass flow rate of the incoming air ($\dot{M}_{in}$).

20. The method of claim 19 wherein the step of measuring the concentration of the gas in the enclosed space (x) includes sensing the concentration of the gas in the enclosed space (x) with a first sensor, and the step of measuring the mass concentration of the gas in the incoming air ($x_{in}$) includes sensing the mass concentration of the gas in the incoming air ($x_{in}$) with a second sensor.

21. The method of claim 19 wherein the step of measuring the concentration of the gas in the enclosed space (x) includes sensing the concentration of the gas in the enclosed space (x) with a first sensor, and the step of measuring the mass concentration of the gas in the incoming air ($x_{in}$) includes sensing the mass concentration of the gas in the incoming air ($x_{in}$) with the first sensor.

22. The method of claim 19 wherein the step of causing the gas flow model circuit to generate the estimated gas generation rate value is repeated at predefined intervals, where n represents a given time interval, n–1 represents a time interval just prior to n, and n–2 represents the time interval just prior to n–1, wherein the estimated gas generation rate value is generated based upon the relationships expressed in the equation:

$$\frac{1}{2\tau}(x(n)-x(n-2))=$$

$$\frac{\dot{M}_{in}}{M}\left(x_{in}(n-1)-\frac{1}{2}(x(n)+x(n-2))\right)+\frac{1}{M}\dot{m}_{gen}(n-1)$$

where $\dot{m}_{gen}$ is the rate at which the gas is being generated within the enclosed space;

M is the total mass of air in the enclosed space;

$\dot{M}_{in}$ the mass flow rate of the incoming air;

x is the concentration of the gas in the enclosed space;

$x_{in}$ is the mass concentration of the gas in the incoming air;

τ means the time interval between one sampling and the next;

n is a specified sampling time;

n–1 is the sampling time previous to the sampling time represented by n; and n–2 is the sampling time previous to the sampling time represented by n–1.

23. The method of claim 17 wherein the step of causing the gas flow model circuit to generate the estimated gas generation rate value includes causing the gas flow model circuit to generate the estimated gas generation rate value according to the relationships expressed in the equation:

$$M\dot{x}-\dot{m}_{gen}=\dot{M}_{in}(x_{in}-x)$$

where

M is the total mass of air in the enclosed space;

$\dot{m}_{gen}$ is the rate at which the gas is being generated within the enclosed space;

x is the concentration of the gas in the enclosed space;

$\dot{x}$ is the time rate of change of the concentration of the gas in the enclosed space (x);

$x_{in}$ is the mass concentration of the gas in the incoming air; and $\dot{M}_{in}$ is the mass flow rate of the incoming air.

24. The method of claim 23 wherein the selected environmental variables are measured at discrete time intervals, the gas flow model circuit generating the estimated gas generation rate based upon the relationships expressed in the equation:

$$\frac{1}{2\tau}(x(n)-x(n-2))=$$

$$\frac{\dot{M}_{in}}{M}\left(x_{in}(n-1)-\frac{1}{2}(x(n)+x(n-2))\right)+\frac{1}{M}\dot{m}_{gen}(n-1)$$

where $\dot{m}_{gen}$ is the rate at which the gas is being generated within the enclosed space;

M is the total mass of air in the enclosed space;

$\dot{M}_{in}$ the mass flow rate of the incoming air;

x is the concentration of the gas in the enclosed space;

$x_{in}$ is the mass concentration of the gas in the incoming air;

τ means the time interval between one sampling and the next;

n is a specified sampling time;

n–1 is the sampling time previous to the sampling time represented by n; and n–2 is the sampling time previous to the sampling time represented by n–1.

25. The method of claim 24 wherein the step of measuring selected environmental variables includes causing a single, multiplexed sensor to measure the concentration of the gas in the enclosed space (x) and the mass concentration of the gas in the incoming air ($x_{in}$) during alternating time intervals of the discrete time intervals.

26. The method of claim 24 wherein the step of measuring selected environmental variables includes measuring the concentration of the gas in the enclosed space (x), the mass concentration of the gas in the incoming air ($x_{in}$), and the total mass of air in the enclosed space (M), the step of causing the gas flow model circuit to generate the estimated gas generation rate value includes causing the gas flow model circuit to estimate the mass flow rate of the incoming air ($\dot{M}_{in}$) and the rate at which the gas is being generated within the enclosed space ($\dot{m}_{gen}$) based on the concentration of the gas in the enclosed space (x), the mass concentration of carbon dioxide in the incoming air ($x_{in}$), and the total mass of air in the enclosed space (M).

27. The method of claim 24 wherein the step of measuring selected environmental variables includes measuring the concentration of the gas in the enclosed space (x), the mass concentration of the gas in the incoming air ($x_{in}$), and the mass flow rate of the incoming air ($\dot{M}_{in}$), the step of causing the gas flow model circuit to generate the estimated gas generation rate value includes causing the gas flow model circuit to estimate the total mass of air in the enclosed space (M) and the rate at which the gas is being generated within the enclosed space ($\dot{m}_{gen}$) based on the concentration of the gas in the enclosed space (x), the mass concentration of the gas in the incoming air ($x_{in}$), and the mass flow rate of the incoming air ($\dot{M}_{in}$).

28. The method of claim 24 wherein the gas is carbon dioxide.

29. A building control system, comprising:

a plurality of sensors disposed to sense values of specified environmental variables in an enclosed space; and a controller, operatively connected with the plurality of sensors, configured to receive the values from the plurality of sensors and generate control signals responsive to the values, the controller including an interface circuit operatively connected with the plurality of sensors;

a gas flow model circuit operatively connected with the interface circuit, the gas flow model circuit being configured to receive the values from the plurality of sensors through the interface circuit, the gas flow model circuit being further configured to generate, responsive to the values, an estimated gas generation rate value representative of the rate at which a gas is generated in the enclosed space;

processing and control means, operatively connected with the gas flow model, the processing and control means including a memory, the processing and control means being configured to receive the estimated gas generation rate value from the gas flow model circuit, to process the estimated gas generation rate value according to instructions stored in the memory, and to generate the control signals responsive to the estimated gas generation rate value.

30. The building control system of claim 29, wherein the estimated gas generation rate value is representative of the rate at which carbon dioxide is generated in the enclosed space.

31. The building control system of claim 30, wherein the processing and control means is configured to compare the estimated gas generation rate value with a predetermined threshold rate, and to generate a control signal to indicate the presence of an occupant in the enclosed space when the estimated gas generation rate value is greater than the threshold rate.

32. The building control system of claim 31 further comprising an alarm operatively connected with the processing and control means, the processing and control means transmitting the control signal to the alarm to activate the alarm when the estimated gas generation rate satisfies a predetermined criterion.

33. The building control system of claim 31 further comprising a switch for activating a device within the enclosed space, the switch being operatively connected with the processing and control means, the processing and control means transmitting the control signal to the switch to cause the switch to activate the device when the estimated gas generation rate value is greater than the threshold rate.

34. The building control system of claim 33 wherein the processing and control means transmits a control signal to the switch to cause the switch to deactivate the device when the estimated gas generation rate value is less than the threshold rate.

35. The building control system of claim 30 wherein the processing means is configured to generate an estimated number of occupants value based on the estimated gas generation rate value.

36. The building control system of claim 35 further comprising an HVAC system operatively connected with the processing and control means, the processing and control means transmitting the control signals to the HVAC system, the HVAC system controlling specified environmental conditions in the enclosed space in response to the control signals.

37. The building control system of claim 36 wherein the specified environmental conditions include the outdoor flow rate of air within the enclosed space, the processing and control means being configured to generate control signals to cause the HVAC to increase the outdoor air flow rate in response to an increase in the estimated number of occupants value, and to decrease the outdoor air flow rate in response to a decrease in the estimated number of occupants value.

38. The building control system of claim 30 wherein the processing and control means is configured to estimate a bodily heat production value responsive to a value representative of the number of occupants in the enclosed space and the rate at which carbon dioxide is generated in the enclosed space, the processing and control means being configured to generate the plurality of control signals responsive to the bodily heat production value.

* * * * *